United States Patent
Grogan et al.

(10) Patent No.: US 12,186,807 B2
(45) Date of Patent: *Jan. 7, 2025

(54) HETEROGENEOUS COMPOSITE BODIES WITH ISOLATED CERMET REGIONS FORMED BY HIGH TEMPERATURE, RAPID CONSOLIDATION

(71) Applicant: Powdermet, Inc., Euclid, OH (US)

(72) Inventors: Mark Grogan, Cleveland, OH (US); Brian Doud, Cleveland Heights, OH (US); Andrew Sherman, Mentor, OH (US)

(73) Assignee: POWDERMET, INC., Euclid, OH (US)

( * ) Notice: Subject to any disclaimer, the term of this patent is extended or adjusted under 35 U.S.C. 154(b) by 87 days.

This patent is subject to a terminal disclaimer.

(21) Appl. No.: 17/992,400

(22) Filed: Nov. 22, 2022

(65) Prior Publication Data

US 2023/0226605 A1 Jul. 20, 2023

Related U.S. Application Data

(60) Continuation of application No. 17/370,431, filed on Jul. 8, 2021, now Pat. No. 11,534,845, which is a
(Continued)

(51) Int. Cl.
*B22F 3/105* (2006.01)
*B22F 1/17* (2022.01)
(Continued)

(52) U.S. Cl.
CPC ............... *B22F 3/105* (2013.01); *B22F 1/17* (2022.01); *B22F 3/14* (2013.01); *B22F 3/15* (2013.01);
(Continued)

(58) Field of Classification Search
None
See application file for complete search history.

(56) References Cited

U.S. PATENT DOCUMENTS 3,180,728 A 4/1965 Pryor et al.
3,445,731 A 5/1969 Saeki et al.
(Continued)

FOREIGN PATENT DOCUMENTS

WO 2011057728 5/2011

OTHER PUBLICATIONS

US Search Authority, International Search Report and Written Opinion for related PCT Application No. PCT/US2015/016776 (May 27, 2015).
(Continued)

Primary Examiner — Seth Dumbris
(74) Attorney, Agent, or Firm — UB Greensfelder LLP

(57) ABSTRACT

A heterogeneous composite consisting of near-nano ceramic clusters dispersed within a ductile matrix. The composite is formed through the high temperature compaction of a starting powder consisting of a core of ceramic nanoparticles held together with metallic binder. This core is clad with a ductile metal such that when the final powder is consolidated, the ductile metal forms a tough, near-zero contiguity matrix. The material is consolidated using any means that will maintain its heterogeneous structure.

19 Claims, 2 Drawing Sheets

Related U.S. Application Data continuation of application No. 15/814,936, filed on Nov. 16, 2017, now Pat. No. 11,117,206, which is a division of application No. 14/713,722, filed on May 15, 2015, now Pat. No. 9,943,918.

(60) Provisional application No. 61/994,483, filed on May 16, 2014.

(51) Int. Cl.

| | | |
|---|---|---|
| *B22F 3/14* | (2006.01) | |
| *B22F 3/15* | (2006.01) | |
| *B22F 3/17* | (2006.01) | |
| *B22F 3/18* | (2006.01) | |
| *B22F 3/20* | (2006.01) | |
| *B22F 3/24* | (2006.01) | |
| *B23H 1/08* | (2006.01) | |
| *B23H 5/04* | (2006.01) | |
| *B23H 5/12* | (2006.01) | |
| *B23H 7/00* | (2006.01) | |
| *B23P 13/02* | (2006.01) | |
| *C04B 35/56* | (2006.01) | |
| *C04B 35/58* | (2006.01) | |
| *C22C 29/00* | (2006.01) | |
| *C22C 29/06* | (2006.01) | |
| *C22C 29/08* | (2006.01) | |
| *C22C 29/14* | (2006.01) | |
| *C22C 32/00* | (2006.01) | |
| *F16C 33/00* | (2006.01) | |
| *F16C 17/00* | (2006.01) | |
| *F16C 19/00* | (2006.01) | |
| *F16C 33/04* | (2006.01) | |

(52) U.S. Cl.
CPC ............... *B22F 3/17* (2013.01); *B22F 3/18* (2013.01); *B22F 3/20* (2013.01); *B22F 3/24* (2013.01); *B23H 1/08* (2013.01); *B23H 5/04* (2013.01); *B23H 5/12* (2013.01); *B23H 7/00* (2013.01); *B23P 13/02* (2013.01); *C04B 35/5626* (2013.01); *C04B 35/58014* (2013.01); *C22C 29/00* (2013.01); *C22C 29/005* (2013.01); *C22C 29/065* (2013.01); *C22C 29/08* (2013.01); *C22C 29/14* (2013.01); *C22C 32/00* (2013.01); *F16C 33/00* (2013.01); *F16C 17/00* (2013.01); *F16C 19/00* (2013.01); *F16C 33/043* (2013.01); *F16C 2206/80* (2013.01)

(56) References Cited

U.S. PATENT DOCUMENTS

| | | | |
|---|---|---|---|
| 4,264,362 | A | 4/1981 | Sergev et al. |
| 4,455,354 | A | 6/1984 | Dillon |
| 5,106,702 | A | 4/1992 | Walker et al. |
| 5,880,382 | A | 3/1999 | Fang et al. |
| 6,315,454 | B1 | 11/2001 | Niwa |
| 7,475,743 | B2 | 1/2009 | Liang et al. |
| 7,635,515 | B1 | 12/2009 | Sherman |
| 8,211,203 | B2 | 7/2012 | Sheng et al. |
| 8,308,096 | B2 | 11/2012 | Mrichandani et al. |
| 8,469,796 | B2 | 6/2013 | Sherman |
| 8,839,887 | B2 | 9/2014 | Xia et al. |
| 8,945,720 | B2 | 2/2015 | Sreshta et al. |
| 9,850,557 | B2 | 12/2017 | Yamanishi et al. |
| 9,943,918 | B2 * | 4/2018 | Grogan ............... B23H 1/08 |
| 11,117,206 | B2 * | 9/2021 | Grogan ............... B23H 7/00 |
| 11,534,845 | B2 * | 12/2022 | Grogan ............... F16C 33/00 |
| 2005/0275143 | A1 * | 12/2005 | Toth ............... C04B 35/628 |
| | | | 264/646 |
| 2006/0207387 | A1 | 9/2006 | Soran et al. |
| 2008/0016985 | A1 | 1/2008 | Tokunaga |
| 2010/0021721 | A1 | 1/2010 | Werler |
| 2011/0030440 | A1 | 2/2011 | Keane et al. |
| 2012/0080189 | A1 | 4/2012 | Marya et al. |
| 2012/0177905 | A1 | 7/2012 | Seals et al. |
| 2013/0068411 | A1 | 3/2013 | Forde et al. |
| 2014/0078210 | A1 | 3/2014 | Ishida et al. |
| 2015/0225301 | A1 | 8/2015 | Schulz et al. |

OTHER PUBLICATIONS

Sigworth et al., "Grain Refinement of Aluminum Castings Alloys", American Foundry Society, Paper 07-067; pp. 5-7 (2007).

Momentive, "Titanium Diborid Powder" condensed product brochure; retrieved from https://www.momentive.com/WorkArea/DownloadAsset.aspx?id+27498>; p. 1 (2012).

Durbin, "Modeling Dissolution in Aluminum Alloys", Dissertation for Georgia Institute of Technology; retrieved from https://smartech;gatech/edu/bitstreat/handle/1853/6873/durbin_tracie_L_200505_phd.pdf> (2005).

Pegeut et al., "Influence of cold working on the pitting corrosion resistance of stainless steel", Corrosion Science, vol. 49, pp. 1933-1948 (2007).

US Search Authority, International Search Report and Written Opinion for related PCT Application No. PCT/US2015/031099 (Jan. 7, 2016).

\* cited by examiner

HETEROGENEOUS COMPOSITE BODIES WITH ISOLATED CERMET REGIONS FORMED BY HIGH TEMPERATURE, RAPID CONSOLIDATION

The present invention is a continuation of U.S. patent application Ser. No. 17/370,431 filed Jul. 8, 2021, which in turn is a continuation of U.S. patent application Ser. No. 15/814,936 filed Nov. 16, 2017, now U.S. Pat. No. 11,117,206, which in turn is a divisional application of U.S. patent application Ser. No. 14/713,722 filed May 15, 2015, now U.S. Pat. No. 9,943,918, which in turn claims priority on U.S. Provisional Patent Application Ser. No. 61/994,483 filed May 16, 2014, which are all incorporated herein by reference.

This invention was made with U.S. government support under Contract No. N68335-14-C-0051 awarded by U.S. Navy. The U.S. government has certain rights in the invention.

FIELD OF THE INVENTION

The invention relates in general to heterogeneous composites comprised of non-angular approximately spherical-, lenticular-, oval-, or elliptical-shaped ceramic rich ceramic-metallic ("cermet") regions bonded in a ductile matrix. More particularly, the invention relates to heterogeneous composites having a bi-modal microstructure comprised of a ductile metal matrix and a plurality of generally oval- or spherical-shaped ceramic rich cermet regions embedded in the ductile metal matrix. The ceramic rich cermet regions are configured in a generally tiled, but substantially separated, relationship so as to present a tightly bonded ceramic rich wear surface on a tough, impact resistant composite body. Further, the invention relates to solid components of such heterogeneous composite, which components are formed by rapid compaction at temperatures near or in excess of the melting point of the material. Further, the invention relates to the use of such components in bearings, gears, valves, fittings, or seals. More specifically, the invention relates to the use of such components in roller bearing elements in which the bearing elements are machined from consolidated billets. The billets are highly machinable.

BACKGROUND OF THE INVENTION

In technologies that use bearings, current bearing materials are made of various types of bearing steels. Alternative ceramic materials, such as silicon nitride, are superior to steel in areas such as hardness, corrosion resistance, Young's Modulus, and thermal expansion; however, steel maintains greater fracture toughness as compared to silicon nitride. Fracture toughness allows a material to resist further crack propagation upon initial damage, a highly desirable trait in the application of roller bearings especially in the roller elements for which this material is targeted. Fracture toughness is dependent on both the material composition and the material microstructure. Significant investigation has been conducted on silicon nitride bearing components; however, manufacturing quality of silicon nitride components is inconsistent as components tend to fail randomly and catastrophically as a result of internal defects. A more robust system and processing technique is desirable for bearing components.

Cemented tungsten carbide, such as WC—Co, is well known for its mechanical properties of hardness, toughness and wear resistance, thereby making it a popular material of choice for use in such industrial applications as mining and drilling. Because of its desired properties, cemented tungsten carbide has been the dominant material used in cutting tools for machining, hard facing, wear inserts, and cutting inserts in rotary cone rock bits, and substrate bodies for drag bit shear cutters. The mechanical properties associated with cemented tungsten carbide and other cermets, especially the unique combination of hardness toughness and wear resistance, make these materials more desirable than either metals or ceramics alone.

For conventional cemented tungsten carbide, fracture toughness is inversely proportional to hardness, and wear resistance is proportional to hardness. Although the fracture toughness of cemented tungsten carbide has been somewhat improved over the years, it is still a limiting factor in demanding industrial applications where cemented tungsten carbide inserts often exhibit gross brittle fracture that leads to catastrophic failure. Traditional metallurgical methods for enhancing fracture toughness, such as grain size refinement, cobalt content optimization, and strengthening agents, have been substantially exhausted with respect to conventional cemented tungsten carbide. The mechanical properties of commercial grade cemented tungsten carbide can be varied within a particular envelope by adjusting the cobalt metal content and grain sizes. For example, the Rockwell A hardness of cemented tungsten carbide can be varied from about 85 to 94, and the fracture toughness can be varied from about 8 to 19 ksi-sqrt (inch). Applications of cemented tungsten carbide are limited to this envelope. Additionally, traditional tungsten carbide lacks in its ability to acquire a smooth surface finish as a result of large particle size within a tungsten carbide compact.

SUMMARY OF THE INVENTION

The invention relates to heterogeneous composites comprised of non-angular approximately spherical-, lenticular-, oval-, or elliptical-shaped ceramic rich cermet regions bonded into a ductile matrix. In one non-limiting embodiment, the invention relates to heterogeneous composites having a bi-modal microstructure comprised of a ductile metal matrix and a plurality of generally oval- or spherical-shaped ceramic rich cermet regions embedded in the ductile metal matrix. The ceramic rich cermet regions can be configured in a generally tiled, but substantially separated relationship, so as to present a tightly bonded ceramic rich wear surface on a tough, impact resistant composite body; however, this is not required. In another and/or alternative embodiment, the invention relates to solid components of said heterogeneous composite, which components are formed by rapid compaction at temperatures near or in excess of the melting point of the material. In still another and/or alternative embodiment, the invention relates to the use of solid components in bearings, gears, valves, fittings, or seals. In yet another and/or alternative embodiment, the invention relates to the use of solid components in roller bearing elements in which the bearing elements are machined from consolidated billets.

In one non-limiting aspect of the invention, the heterogeneous composite is formed from a plurality of ceramic-metallic composites. Each of the ceramic-metallic composites includes a ceramic rich cermet region in the form of a body or core and a coating about the ceramic rich cermet region. The ceramic rich cermet region can be formed of one or more ceramic particles. When the ceramic rich cermet region is formed of a plurality of ceramic particles, the plurality of ceramic particles are generally held together by a binder such as, but not limited to a metallic binder. The ceramic rich cermet region of the ceramic-metallic composites can be coated by any type of coating and/or deposition process. The heterogeneous composite that is formed from a plurality of ceramic-metallic composites is generally formed under conditions of applied heat and impact or force, typically by spark plasma sintering, that transform the ceramic-metallic composites and cause the ceramic rich cermet region of the ceramic-metallic composites to form approximately spherical- or football-shaped ceramic rich cermet regions embedded within a ductile matrix phase of the heterogeneous composite. The ductile matrix phase can be partially or fully formed of the coating material of the ceramic-metallic composites.

Typically, all of the materials that go into the heterogeneous body are contained in the ceramic-metallic composites; however, this is not required. Thus, the composition and physical configuration of the heterogeneous body are at least primarily determined by the composition and configuration of the ceramic-metallic composites, together with the conditions under which the heterogeneous body is formed. The ceramic rich cermet region of the ceramic-metallic composites is ceramic rich. As such, the ceramic rich cermet region of the ceramic-metallic composites has more than fifty percent 50% by weight ceramic material. Typically, the ceramic rich cermet region of the ceramic-metallic composites contain a majority of ceramic material in the form of ceramic particles (e.g., 50.01%, 50.02% . . . 99.98%, 99.99%, 100%, and any value or range therebetween), and at least about 75 weight percent ceramic material in the form of ceramic particles; however, this is not required. The ductile matrix phase is generally rich in metal. As such, the ductile matric phase of the heterogeneous body generally contains more than 50 weight percent (e.g., 50.01%, 50.02% . . . 99.98%, 99.99%, 100%, and any value or range there between) metal, and typically more than about 75 weight percent metal; however, this is not required.

The conditions of formation of the heterogeneous body are such that rather than disperse throughout the matrix phase, the coating on the ceramic-metallic composites soften and deform and may form slightly flattened regions. Typically, the ceramic-metallic composites are slightly deformed to form oval or football shaped regions, but can also form spherical regions and/or other shapes. The degree of deformation depends at least the degree of softening and the force of the consolidation. In general, the softer the coating on the ceramic-metallic composites, the more the deformation. The ceramic rich cermet region of the ceramic-metallic composites can also be deformed during the formation of the heterogeneous body. The composition of the coating on the ceramic-metallic composites and the composition of the ceramic rich cermet region of the ceramic-metallic composites will substantially influence the degree of deformation of the ceramic-metallic composites.

Heat is provided during formation of the heterogeneous body to cause the desired degree of deformation, as well as to cause the desired matrix formation. The heat is typically applied rapidly so that the ceramic-metallic composites retain their identity as separated individual ceramic rich cermet regions. Conversely, enough heat must be provided to cause the matrix phase to form. Typically, the matrix phase is substantially continuous and pore-free; however, this is not required. The composition of the ceramic rich cermet region and the matrix precursor generally are balanced so that the amount of heat required to form the isolated ceramic rich cermet region will also serve to form the desired matrix phase. The necessary heat can be provided, for example, by utilizing spark plasma sintering or conventional hot pressing operations to form the heterogeneous body.

The ductile metal matrix precursor forms a matrix phase that anchors the ceramic rich cermet regions in the heterogeneous body. It also serves to keep the non-angular ceramic rich cermet regions isolated from one another within the heterogeneous body. The ceramic rich cermet regions may deform by a ratio of about 2-30:1, and typically 5-20:1, during formation of the heterogeneous body, but will retain their identity at least enough to define the heterogeneous body substantially surrounded by the ductile metal matrix in the heterogeneous body.

The coating or deposit on the ceramic rich cermet region of the ceramic-metallic composite generally melts and flows sufficiently during formation of the heterogeneous body to form a pore-free ductile metal matrix, but it does not become fluid enough to allow the ceramic rich cermet regions to contact or merge with one another to a significant degree. This formation of the heterogeneous body requires careful control of the parameters of the formation process. Too much heat, for example, will totally melt the binder in the ceramic rich cermet regions and the ceramic particles in the ceramic rich cermet regions will be released to become more or less uniformly distributed within the heterogeneous body. Such homogeneity, according to the present invention, is undesirable. Too little heat used during the formation of the heterogeneous body will result in the heterogeneous body being weak and too porous because the matrix phase will not have properly formed. Also, if the coating on the ceramic-metallic composites is not soft enough, the coating will not deform to the desired degree, or may even not stick to adjacently positioned ceramic-metallic composites so as to form the heterogeneous body. Changes in the composition of either the ceramic rich cermet regions and/or the coating on the ceramic rich cermet regions will influence the formation of the heterogeneous body.

The parameters of the formation process are generally established by an iterative procedure. In general, it is desirable to form a heterogeneous body under known conditions, test and examine the resulting heterogeneous body, change one or more parameters in a controlled amount, and repeat to procedure until the desired heterogeneous body is produced.

For purposes of uniformity of the heterogeneous body, the ceramic-metallic composites can be substantially uniform in size and physical form; however, this is not required. A generally spherical physical form is desirable since resulting cermet regions tend to be more uniform in size, distribution and orientation within the heterogeneous body. Typically, each ceramic-metallic composite forms one ceramic rich cermet region.

Generally, the ductile metal matrix precursor is substantially uniform in composition and the deposit thickness of the metal on the ceramic rich cermet region of the ceramic-metallic composites is maintained at desired thickness so that the desired uniformity of ceramic rich cermet region spacing, size, integrity, orientation and composition in the heterogeneous body is obtained; however, this is not required. The coating thickness of the metal coating on the ceramic-metallic composites generally controls, to a significant degree, the spacing between the ceramic rich cermet regions. Increasing the thickness of the metal coating generally increases the amount of spacing between the ceramic rich cermet regions in the finished heterogeneous body.

As formed, a layer of approximately lenticular ceramic rich cermet regions is typically embedded slightly below the surface of a layer of the matrix phase. In use, the matrix phase layer over the ceramic rich cermet regions is usually quickly abraded away, thus exposing the top surfaces of the ceramic rich cermet regions. The thusly exposed obverse faces of the tiled ceramic rich cermet regions present a hard wear resistant surface that generally covers substantially all of the heterogeneous body, and appears in plain view to be substantially continuous. The reverse faces of the ceramic rich cermet regions are generally firmly bonded over the entire width of the ceramic rich cermet regions to the heterogeneous body. The isolated ceramic rich cermet regions are thus firmly bonded over a wide area by the matrix phase to the heterogeneous body. The toughness and impact resistance of the heterogeneous body are improved by the matrix phase, which in cross-section is generally substantially continuous.

The heterogeneous nature of the heterogeneous body provides substantial advantages. The heterogeneous body according to the present invention can be used to provide a tool with hardness and wear resistance characteristics that would require a much higher ceramic content if the body were not homogeneous. At the same time, the heterogeneous body provides a tool with strength, toughness, and impact resistance characteristics that are much higher than would be possible with a homogeneous body that exhibits the same hardness and wear resistance.

The body of material is generally formed as an individual component and is typically formed in a cylindrical shape, but can be formed as a more complex shape or near-net shape. The ductile metal matrix enables easy machining of the component to desired dimensions and tolerances. Furthermore, the small size of the cermet particles allows for the material to be machined to a smooth finish. This makes the invention ideal in low-friction applications, particularly rolling and sliding contact bodies in bearings.

The present invention is applicable to a wide variety of materials. The hard ceramic particles or grains in the ceramic rich cermet regions can be, for example, the carbides, borides, oxides, and/or nitrides of tungsten, titanium, chromium, aluminum, molybdenum, silicon, niobium, zirconium, boron, and/or tantalum. Mixtures of various hard ceramic particles or grains can be used if desired. Tungsten carbide, for example, is widely used and widely available in the form of scrap cemented carbide tooling that may contain other hard materials such as titanium nitride, or the like, and a cobalt binder. Pulverized scrap cemented carbide tooling is suitable for use according to the present invention. Such scrap can be used because it promotes the recycling of scarce and expensive raw materials. The present invention permits the use of a wide variety of raw materials. Since many of the advantages of the present invention are achieved because of the physical configuration of the heterogeneous body, a wide variety of different materials and mixtures of materials can be employed, as may be desired. The parameters of the operating system are determined for different materials by the previously described iterative process regardless of whether the raw material is scrap and/or virgin.

The metallic binder in the ceramic rich cermet regions can comprise, for example, aluminum, nickel, iron, cobalt, titanium, mixtures and alloys thereof, and the like. Typically, the ceramic rich cermet regions have a metallic binder content of about 3-15 weight percent (e.g., 3 wt %, 3.01 wt %, 3.02 wt % . . . 14.98 wt %, 14.99 wt %, 15 wt %, and any value or range there between) based on the weight of the ceramic rich cermet region.

The metal coating or deposit on the ceramic rich cermet region of the ceramic-metallic composite can be, for example, cobalt, iron, nickel, titanium, aluminum, niobium, mixtures and alloys thereof, and the like. The metal content in the coating or deposit on the ceramic rich cermet region of the ceramic-metallic composite is generally greater than the metallic content in the metallic binder content in the ceramic rich cermet regions; however, this is not required.

The average size of the ceramic rich cermet region in the ceramic-metallic composite is adjusted to accommodate the desired size of the ceramic rich cermet regions in the resulting heterogeneous body and the nature of the process that is used to form the heterogeneous body.

The average width of the ceramic rich cermet region in the heterogeneous body according to the present invention depends in part on the average size and degree of deformation of the ceramic-metallic composite. Where a high heat process is used, some of the exterior of the ceramic rich cermet region will melt and disperse into the matrix phase, thus reducing somewhat the detectable size of the ceramic rich cermet regions. The average widths of the ceramic rich cermet region is generally range from approximately 5 to 6000 microns (e.g., 5 microns, 5.01 microns, 5.02 microns . . . 5999.98 microns, 5999.99 microns, 6000 microns, and any value or range there between), and typically about 5 to 100 microns.

The average particle size of the ceramic particles within the ceramic rich cermet region generally ranges from about 0.1 to 10 microns (e.g., 0.1 microns, 0.101 microns, 0.102 microns . . . 9.998 microns, 9.999 microns, 10 microns, and any value or range there between), and typically about 0.2-0.4 microns. The size of these particles set this material apart from traditional cermet compositions that utilize much larger ceramic particles.

In one non-limiting embodiment of the invention, there is provided a heterogeneous composite consisting of near-nano ceramic clusters dispersed within a ductile matrix. The composite is formed through the high temperature compaction of a starting powder consisting of a core of ceramic nanoparticles held together with metallic binder. This core is clad with a ductile metal such that when the final powder is consolidated, the ductile metal forms a tough, near-zero contiguity matrix. The material is consolidated using any means that will maintain its heterogeneous structure. One non-limiting consolidation technique is spark plasma sintering. As a result of the material's unique microstructure, the material exhibits elevated hardness and modulus, (e.g., greater than about 10 GPa and about 200 GPa respectively) while maintaining high fracture toughness (e.g., greater than about 18 MPa-m$^{1/2}$). In addition, as a result of the microstructure, the material is highly resistant to rolling contact fatigue. This makes the material ideal for a variety of applications such as, but not limited to, roller bearings.

In summary, the present invention pertains to a heterogeneous body having an outer surface, and the heterogeneous body includes ceramic rich cermet regions that include ceramic particles having a grain size substantially less than about 1 micron, and wherein the ceramic rich cermet regions are generally non-angular shaped and have an average thickness and an average width, and wherein the average width being between one and twenty times the average thickness. The ceramic rich cermet regions are generally isolated from one another and have obverse and reverse surfaces and are embedded within a ductile metal matrix. The ceramic rich cermet regions have an average width of about 1-600 microns. The ceramic rich cermet regions can be comprised of about 5 to 70 volume percent metal binder. The ceramic rich cermet regions can comprise about 30 to 95 volume percent of the heterogeneous body. The heterogeneous body includes a ceramic rich cermet regions that can be formed by use of a high temperature compaction method, where the compaction temperature is below the liquidus temperature of the ductile metal matrix and/or binder of the ceramic particles in the ceramic rich cermet regions. During the high temperature compaction process, the ceramic-metallic composites are subject to no more than 30 minutes to a temperature above about 80% of the melting temperature of the coating on the ceramic-metallic composites or binder of the ceramic particles in the ceramic rich cermet regions of the ceramic-metallic composites, and typically no more than about 10 minutes to a temperature above about 80% of the melting temperature of the coating on the ceramic-metallic composites or binder of the ceramic particles in the ceramic rich cermet regions of the ceramic-metallic composites. The high temperature compaction process can include spark plasma sintering, field assisted sintering technique, spark plasma or field assisted extrusion, rapid omnidirectional compaction, powder forging, hot isostatic pressing, hot pressing, and/or powder rolling with spark plasma sintering. The average width of the ceramic rich cermet region is generally no greater than about 4 times (e.g., 1.1 times, 1.2 times . . . 3.9 times, 4 times, and any value or range therebetween) the thickness of the metallic coating on the ceramic rich cermet region; however, this is not required. The heterogeneous structure ceramic rich cermet region is derived from the heated compaction of clad, micro- or nano-composite ceramic particles. The binder of the ceramic rich cermet regions can be substantially the same as the metal in the ductile metal matrix; however, this is not required. The binder of the ceramic rich cermet region can include one or more metals selected from the group consisting of nickel, cobalt, iron, molybdenum, titanium, copper, or their alloys. The ceramic rich cermet regions include one or more ceramic material selected from the group consisting of metal carbides, nitrides, oxynitrides, and borides. For example, the ceramic material in the ceramic rich cermet regions can include one or more materials selected from the group consisting of WC, SiC, TiC, TiN, $Si_3N_4$, SiAlON, TiCN, $B_4C$, $TiB_2$, or other borides. The average grain or particle size of the ceramic material in the ceramic rich cermet region is about 0.05 to 1 microns, typically less than about 0.6 microns, and more typically less than about 0.4 microns. The mean free path of the ductile metal matrix in heterogeneous body, as defined by the distance between the ceramic rich cermet regions in the heterogeneous body, is about 0.5-5 microns.

The present invention is also directed to a solid component of a cermet that has been consolidated using a high rate solid state sintering process. The solid component includes a heterogeneous body formed in situ in a high rate solid state sintering process. The heterogeneous body includes ceramic rich cermet regions. The ceramic rich cermet regions ceramic particles and about 3 to 60 weight percent of a binder. The ceramic rich cermet regions generally are isolated from one another and are embedded within a ductile metal matrix. In one non-limiting arrangement, a majority of the ceramic rich cermet regions generally are isolated from one another. The ceramic rich cermet regions are approximately spherical or football shaped with an aspect ratio of less than about 1 to 4 and oriented with their longest dimensions approximately parallel to one another. The ductile metal matrix has a continuous mean free path of about 0.5 and 5 microns.

The present invention is also directed to a method of spark plasma sintering a heterogeneous solid. The method includes selecting ceramic-metallic composites that include a ceramic rich cermet region coating with a metal material. The ceramic-metallic composites have an average particle size and include a ceramic rich cermet region substantially encapsulated within a metal. The ceramic-metallic composites have an average particle size of about 1 to 500 microns, and typically about 5 to 60 microns. The ceramic rich cermet region includes at least a ceramic material and a metallic binder. The method also includes the step of establishing a compacted powder bed of the ceramic-metallic composites wherein the metallic binder and metal coating are at least softened and the ceramic rich cermet region substantially retain their individual identities. The method also includes the step of allowing the softened ceramic-metallic composites to compact and form spherical- to lenticular-shaped ceramic rich cermet regions in a ductile metal matrix substantially formed from the metal coating. The ceramic rich cermet regions are generally isolated from one another, and are embedded within the ductile metal matrix, and have an average width and an average thickness, the average width being equal to or greater than the average thickness. The ceramic-metallic composites can have an average particle size of about 5 to 60 microns and an approximately spherical or oval shape. The method can include the step of selecting complex composite particles comprised of WC—Co. The method can include the step of selecting a coating on the ceramic-metallic composites comprised of Co. The method can include the step of selecting a ceramic rich cermet region comprised of TiN—Ni. The method can include the step of selecting a coating comprised of nickel, cobalt, iron, titanium, molybdenum, chromium, and/or their alloys. The method can include the step of selecting ceramic-metallic composites wherein the metal coating has an average thickness of from about 1 to 40 percent of the average width or diameter of the ceramic rich cermet region. The method can include the step of selecting ceramic-metallic composites that includes about 7 to 60 volume percent metal coating. The method can include the step of allowing the compacted powder bed of ceramic-metallic composites to form ceramic rich cermet regions wherein the average width is no more than about 20 times the average thickness of the ceramic rich cermet regions. The resulting mean free path between the ceramic rich cermet regions in the heterogeneous body is about 0.25-10 microns, and typically about 0.5-3 microns.

The invention also relates to a heterogeneous body having an outer surface, said heterogeneous body includes ceramic rich cermet regions generally comprising ceramic-metallic composites. The ceramic material in the ceramic rich cermet regions includes one or more materials selected from the group consisting of tungsten$_x$, titanium$_x$, chromium$_x$, aluminum$_x$, molybdenum$_x$, silicon$_x$, niobium$_x$, zirconium$_x$, tantalum$_x$, and mixtures thereof, and wherein x includes one or more materials selected from the group consisting of carbon, boron, nitrogen, oxygen, and mixtures thereof. The ceramic rich cermet regions are approximately lenticular shaped and have an average thickness and an average width, the average width being at least about twice the average thickness. The ceramic rich cermet regions are generally isolated from one another and are embedded within a ductile metal matrix. The ductile metal matrix includes one or more materials selected from the group consisting of cobalt, niobium, titanium, aluminum, iron, niobium, mixtures, and alloys thereof. The ceramic rich cermet regions have an average width of about 5 to 600 microns, and at least a majority of the ceramic rich cermet regions are oriented with their widths approximately parallel to one another. The heterogeneous composite has a toughness above about 10 MPa/m, and typically above about 15-20 Mpa/m. The heterogeneous composite has, in its machined state, a coefficient of friction of less than about 0.3, and typically less than about 0.1. The heterogeneous composite can be formed into a bearing component such as, but not limited to, thrust bearings, cylindrical roller bearings, ball bearings, plain lined spherical bearings, and sleeve bearings. The heterogeneous composite can be formed into a roller bearing element. The heterogeneous composite can be subsequently polished. The heterogeneous composite can be formed into a part that is spherical, cylindrical, angular, or curved in shape. The roller bearing element can be rough machined, then machined to high tolerances and finishes using an outside diameter cylindrical grinding and lapping device with non-diamond grinding media. The heterogeneous composite can have a hardness exceeding about 10 GPa, while also exhibiting a Young's modulus exceeding about 200 GPa, and also exhibits fracture toughness exceeding about 18 MPa-m$^{1/2}$, and withstands in excess of about 50 million stress cycles at greater than about 2 GPa Hertzian contact stress in rolling contact fatigue testing.

Other objects, advantages, and novel features of the present invention will become apparent from the following detailed description of the invention when considered in conjunction with the accompanying drawings.

BRIEF DESCRIPTION OF THE DRAWINGS

Referring particularly to the drawings for the purposes of illustration only and not limitation.

DETAILED DESCRIPTION OF THE PREFERRED EMBODIMENTS

Figure 1:
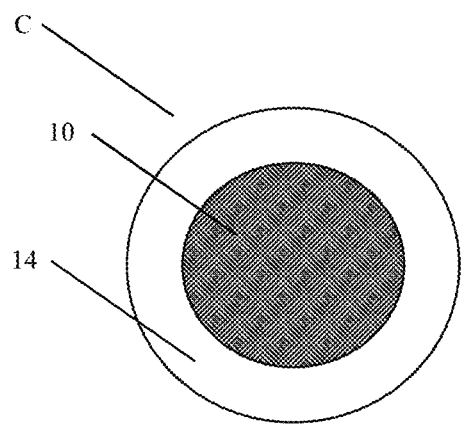
FIG. 1 is a diagrammatic cross section of a ceramic-metallic composite formed of body or core of ceramic rich cermet region 10 and a metal coating 12.
Figure 2:
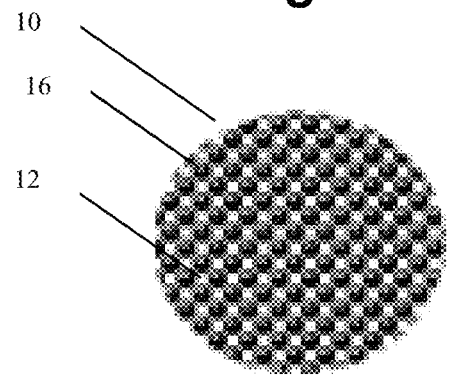
FIG. 2 is more detailed view of the ceramic rich cermet region that is formed of a plurality of ceramic particles that are connected together by a metallic binder.

Referring now to the drawings wherein like reference numerals designate identical or corresponding parts throughout the several views, there is illustrated generally at FIG. 1 a ceramic-metallic composite which has been spherodized. As can be appreciated, the ceramic-metallic composite can have many other shapes. The ceramic-metallic composite in FIGS. 1-2 is a ceramic rich material that includes a ceramic rich cermet region 10 that is coated by a metal coating 14. The thickness of the coating is sufficient to provide the desired amount of spacing between ceramic rich cermet regions in a heterogeneous body formed from the ceramic-metallic composite 10. Typically, the thickness of the coating is about 1 to 40 percent of the diameter of the ceramic rich cermet region, and more typically about 1 to 10 percent of the diameter of the ceramic rich composite ceramic-metallic particle. FIG. 2 illustrates a more detailed view of the ceramic rich cermet region which is formed of a plurality of ceramic particles 16 bonded together by a metallic binder 12.

Figure 3:
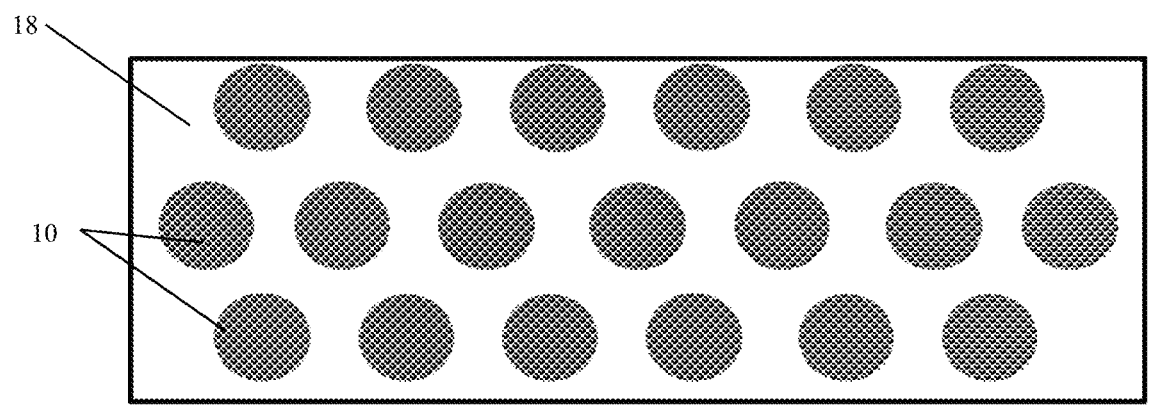
FIG. 3 is a diagrammatic cross section of a consolidated section of a part that is formed by a plurality of ceramic rich cermet region generally evenly distributed throughout the ductile metal matrix 12.

There is indicated generally at FIG. 3 a consolidated composite of particles where coating 14 forms the ductile metal matrix 18 when the ceramic-metallic composite are consolidated together. The ceramic rich cermet regions 10 are illustrated as being spaced apart from one another by the ductile metal matrix 18 and the ceramic rich cermet region 10 have generally maintained their shape. This type of consolidated material is typically formed by spark plasma sintering, but can also be formed by another high temperature rapid compaction technique. The mean free path between the ceramic rich cermet regions 10 is approximately equal to the thickness of the coating 14; however, this is not required.

Figure 4:
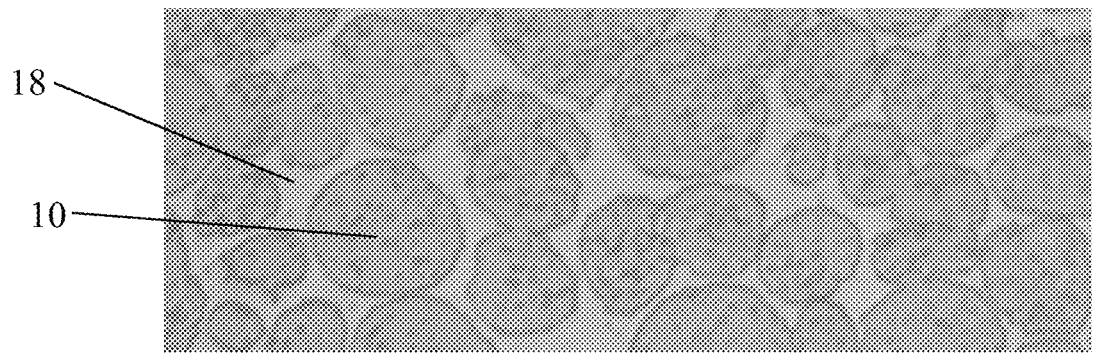
FIG. 4 is a photomicrograph of a consolidated specimen showing the ceramic rich cermet region 10 in a ductile metal matrix 12; and, FIG. 5 is a scanning electron microscope image of a nano-indented sample showing single grains of hard ceramic 30 in a ductile metal matrix 12.
Figure 5:
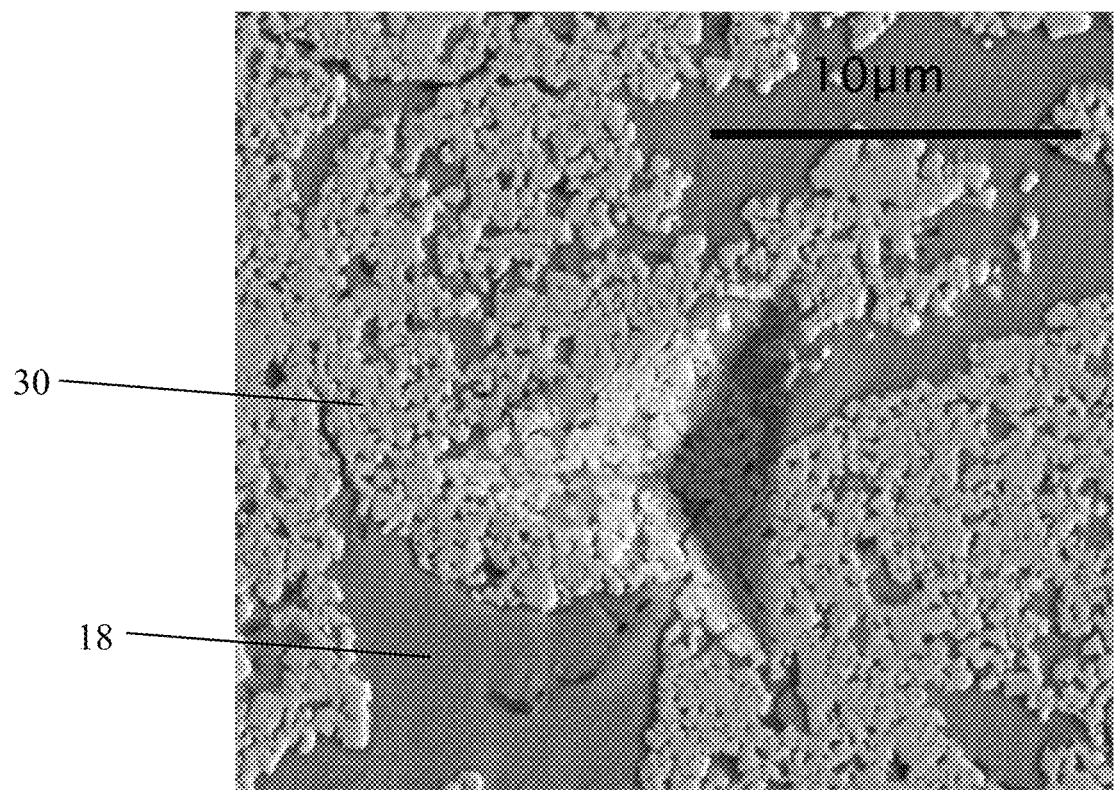

A micrograph of a cross section of consolidated material in FIG. 4 shows verification of the target structure of FIG. 1 in practice. Furthermore, the structure allows for high microfracture toughness as seen in the scanning electron microscope image of the material in FIG. 5. The crack propagation at the tips of the nano-indentation is unobservable, indicating high resistance to micro-fracture as the ductile binder blunts crack propagation and the sub-micron hard ceramic particles 30 limit maximum crack length across a particle. This nano-indent produced no observable cracks within the sample indicating high fracture toughness.

Example 1

A ceramic-metallic composite was produced with a composition of about 45-50 wt % TiN, about 40-45 wt % Co—Mo—Cr, and about 10 weight percent niobium binder. The ceramic-metallic composite was consolidated using spark plasma sintering above about 1000° C. The consolidated material exhibited a hardness of 1278 HV (300) and coefficients of friction of less than about 0.10 in diesel fuel, and about 0.40 in dry contact with steel. No material wear was observed after friction testing with pin on disk tribometer.

Example 2

The material formed in Example 1 was machined using electrical discharge machining into an about 2 in. wide, ¼ in. thick flat thrust bearing with an internal diameter of about 1 in.

Example 3

The material formed in Example 1 was precision-machined using electrical discharge machining into about a 1 in. tall hollow cylinder with about ⅛ in. wall thickness. This cylindrical piece was interference fitted into a steel bushing to form a cermet lined bushing.

Example 4

A ceramic-metallic composite was produced with a composition of about 92-97 weight percent tungsten carbide and about 3-8 wt. % cobalt as the binder and a coating of about 10 weight percent cobalt. The ceramic-metallic composite was consolidated using spark plasma sintering to form about a 2 in. wide by 1.5 in. tall billet. The formed material exhibited a hardness of about 22.95 GPa (2340 HV), a modulus of about 486 GPa, and a fracture toughness greater than about 20 MPa-m$^{1/2}$. The material was machined to a surface roughness between about 3-5 micro-inch and tested for rolling contact fatigue. The formed material survived in excess of about 60 million stress cycles at about 2.5 GPa without showing any sign of wear or spallation. The formed material also exhibited coefficient of friction as low as about 0.35 in dry conditions, and less than about 0.10 in lubrication or liquid including saltwater.

Example 5

A ceramic-metallic composite similar to that produced in Example 4, but the 10 wt. % cobalt coating was substituted for about 10 wt. % nickel coating. The ceramic-metallic composite was consolidated using spark plasma sintering to form about a 2 in. wide by 1.5 in. tall billet. The formed material exhibited a hardness of about 20.07 GPa (2045 HV), a modulus of about 435 GPa, and a fracture toughness greater than about 20 MPa-m$^{1/2}$. When machined to a surface roughness between about 3-5 micro-inch and tested for rolling contact fatigue, the formed material survived in excess of about 60 million stress cycles at about 2.5 GPa without showing any sign of wear or spallation. The formed material also exhibited coefficient of friction as low as about 0.35 in dry conditions, and less than about 0.10 in lubrication or liquid including saltwater.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall there between. The invention has been described with reference to the preferred embodiments. These and other modifications of the preferred embodiments as well as other embodiments of the invention will be obvious from the disclosure herein, whereby the foregoing descriptive matter is to be interpreted merely as illustrative of the invention and not as a limitation. It is intended to include all such modifications and alterations insofar as they come within the scope of the appended claims.

What is claimed is:

1. A heterogeneous body comprised of a plurality of ceramic-metallic composites; each of said ceramic-metallic composites includes a ceramic-rich cermet region coated with a metal coating about an outer surface of said ceramic-rich cermet region; said ceramic-rich cermet region comprises a plurality of ceramic particles that are bonded together by a metallic binder; a majority of said ceramic-rich cermet regions remain intact and are spaced from one another in a metal matrix material; a plurality of said ceramic-rich cermet regions are spaced from one another in said heterogeneous body; a plurality of said ceramic-rich cermet regions in said heterogeneous body are not uniformly distributed in said heterogeneous body; a content of metal in said metal coating greater than a content of metal of said metallic binder.

2. The heterogeneous body as defined in claim 1, wherein a plurality of said ceramic-metallic composites are bonded together by compaction at a temperature and for a time period such that said metal coating of ceramic-metallic composites bonds with said metal coating of adjacently positioned ceramic-metallic composites.

3. The heterogeneous body as defined in claim 1, wherein said metal matrix material at least partially formed of metal in said metal coating of said ceramic-metallic composites.

4. The heterogeneous body as defined in claim 1, wherein a plurality of said ceramic-rich cermet regions are non-angular shaped and have an average thickness and an average width, said average width being between one and twenty times said average thickness, a plurality of said ceramic-rich cermet regions having an average width of about 1-600 microns.

5. The heterogeneous body as defined in claim 1, wherein said ceramic particles includes one or more materials selected from the group consisting of metal carbides, nitrides, oxynitrides, and borides.

6. The heterogeneous body as defined in claim 1, wherein said ceramic particles includes one or more materials selected from the group consisting of Wx, Ti$_x$, Cr$_x$, Al$_x$, Mo$_x$, Si$_x$, Nb$_x$, Zr$_x$, and Ta$_x$, and $_x$ includes one or more materials selected from the group consisting of carbon, boron, nitrogen, and oxygen.

7. The heterogeneous body as defined in claim 1, wherein said ceramic particles includes one or more materials selected from the group consisting of WC, SiC, TiC, TiN, Si$_3$N$_4$, SiAlON, TiCN, B$_4$C, and TiB$_2$.

8. The heterogeneous body as defined in claim 1, wherein said metallic binder includes one or more metals selected from the group consisting of nickel, cobalt, iron, molybdenum, titanium, copper, and chromium.

9. The heterogeneous body as defined in claim 1, wherein an average distance between said ceramic-rich cermet regions in said metal matrix material is about 0.5-5 microns.

10. The heterogeneous body as defined in claim 1, wherein said heterogeneous body is comprised of 40-97 weight percent of said ceramic-metallic composite and about 3-60 weight percent of said metal matrix material.

11. The heterogeneous body as defined in claim 1, wherein said heterogeneous composite has one or more properties selected form the group consisting of i) a toughness above 10 Mpa/m, ii) a hardness exceeding 10 GPa, iii) a Young's modulus exceeding 200 GPa, iv) a fracture toughness exceeding 18 Mpa-m$^{1/2}$, and v) withstands in excess of 50 million stress cycles at greater than 2 GPa Hertzian contact stress in rolling contact fatigue testing.

12. The heterogeneous body as defined in claim 1, wherein a composition of said metal coating is different from a composition of said metallic binder.

13. The heterogeneous body as defined in claim 1, wherein a composition of said metal coating is a same composition as said metallic binder.

14. The heterogeneous body as defined in claim 1, wherein after said heterogeneous composite is machined, said heterogeneous body has a coefficient of friction of less than 0.3.

15. The heterogeneous body as defined in claim 1, each of said ceramic-rich cermet regions include 5-70 vol. % of said metallic binder and 30-95 vol. % of said ceramic particles, a content of metal in said metal coating greater than a content of metal of said metallic binder.

16. A method for making a heterogeneous body having a surface, and wherein said heterogeneous body comprises a plurality of ceramic-metallic composites bonded together, said method comprising:
   a. providing said plurality of ceramic-metallic composites; each of said ceramic-metallic composites including a ceramic-rich cermet region coated with a metal coating about the outer surface of said ceramic-rich cermet region; said ceramic-rich cermet region comprises a plurality of ceramic particles that are bonded together by a metallic binder; and,
   b. binding together said plurality of ceramic-metallic composites by a compaction method to form said heterogeneous body; said compaction method occurring at a temperature and for a time period such that said metal coating of ceramic-metallic composites bonds with said metal coating of adjacently positioned ceramic-metallic composites while said ceramic-rich cermet region of said ceramic-metallic composites remains substantially intact; a plurality of said ceramic-rich cermet regions are spaced from one another in said heterogeneous body after said binding step; and
   wherein said ceramic-metallic composites remain intact after formation of said heterogeneous body and a plurality of said ceramic-metallic composites ceramic-rich cermet regions are spaced from one another in said heterogeneous body; and
   wherein said ceramic-rich cermet regions in said heterogeneous body are not uniformly distributed in said heterogeneous body.

17. The method as defined in claim 16, wherein during said compaction method said ceramic-metallic composites are exposed to temperatures below a melting point temperature of said metallic coating, said metallic binder, or combinations thereof.

18. The method as defined in claim 16, wherein during said compaction method said ceramic-metallic composites are exposed for less than 30 minutes to temperatures of 80%-99.999% of a melting point temperature of said metallic coating, said metallic binder, or combinations thereof.

19. The method as defined in claim 16, wherein said compaction method includes one or more heating methods selected from the group consisting of Spark Plasma Sintering (SPS), Field Assisted Sintering Technique (FAST), Spark Plasma or field assisted extrusion, Rapid Omnidirectional compaction, Powder forging, Hot Isostatic Pressing (HIP), hot pressing, and powder rolling with SPS.

* * * * *